Oct. 13, 1953  J. W. M. DU MOND  2,655,044
HIGH-VACUUM GAUGE

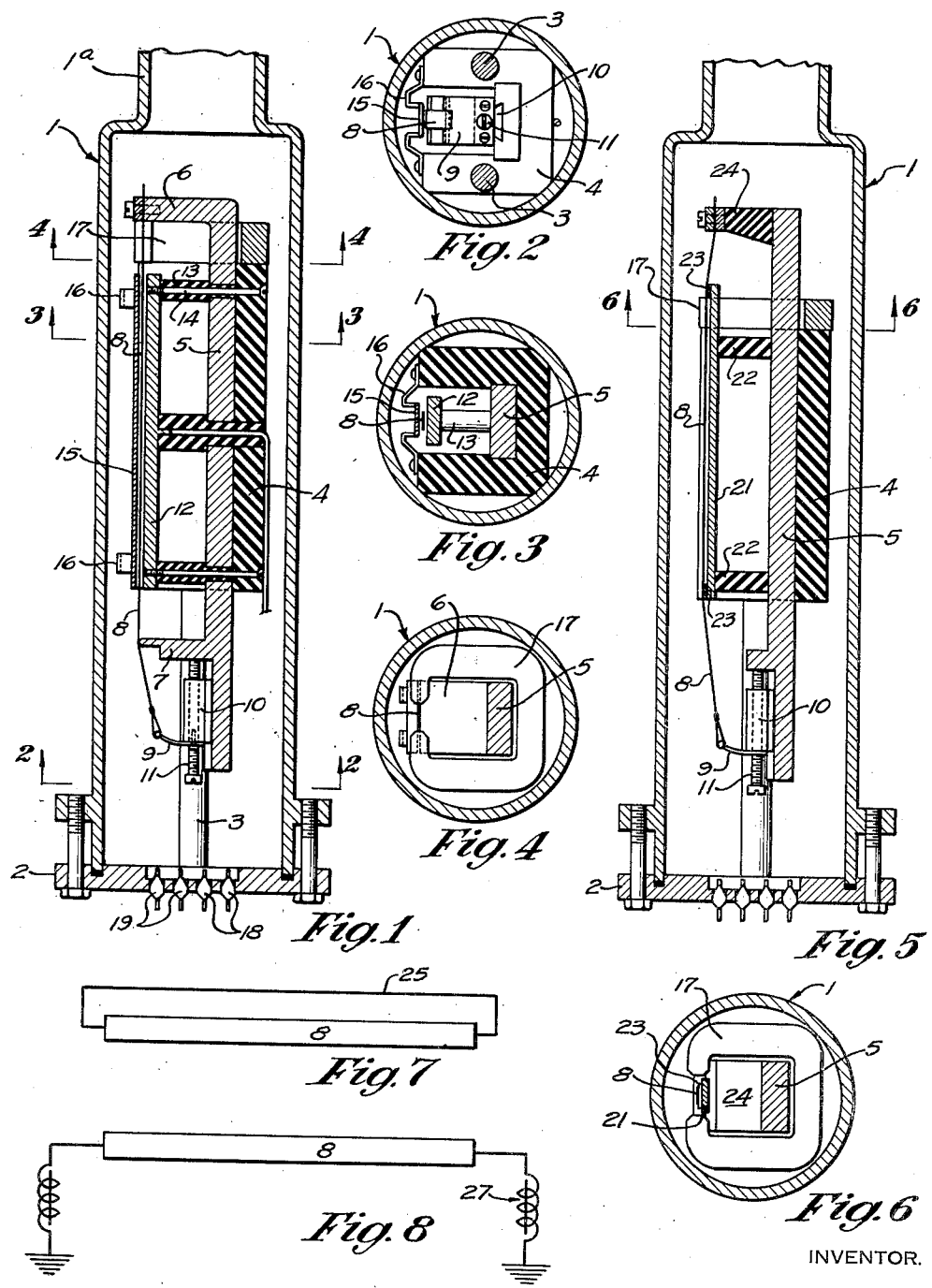

Filed Aug. 8, 1949  3 Sheets-Sheet 2

INVENTOR.
Jesse William Monroe Du Mond
BY Lyon & Lyon
ATTORNEYS.

Oct. 13, 1953     J. W. M. DU MOND     2,655,044
HIGH-VACUUM GAUGE

Filed Aug. 8, 1949     3 Sheets-Sheet 3

INVENTOR.
Jesse William Monroe Du Mond
BY Lyon & Lyon
ATTORNEYS.

Patented Oct. 13, 1953

2,655,044

UNITED STATES PATENT OFFICE 2,655,044

HIGH VACUUM GAUGE

Jesse William Monroe Du Mond, Pasadena, Calif., assignor to California Institute Research Foundation, Pasadena, Calif., a corporation of California Application August 8, 1949, Serial No. 109,100

14 Claims. (Cl. 73—399)

My invention relates to gauges which are particularly designed to measure the low gas pressures existing under high vacuum conditions and is a continuation in part of my previously filed application, Serial #736,794, filed March 24, 1947, now abandoned. Included in the objects of my invention are:

First, to provide an improved high vacuum gauge which utilizes the Knudsen pressure principle; namely, that if a metal vane is placed in a vacuum and confronted on opposite sides by surfaces having different temperatures spaced from the vane by a distance short compared to the mean-free-path for the gas molecules in the vacuum a pressure differential will be established tending to move the metal vane.

Second, to provide a high vacuum gauge wherein the Knudsen vane is employed as the sensitive or movable element of a variable capacitance adapted to be incorporated in an electronic circuit for purposes of indication, recording, or control.

Third, to provide a vacuum gauge which in comparison to other types of high vacuum gauges is sensitive to a wide range of pressures, or may be designed for increased sensitivity in various selected ranges.

Fourth, to provide a vacumm gauge of this character which is inherently compact, relatively insensitive to vibration, and which may be installed and operated in any position without requiring material readjustment.

Fifth, to provide a high vacuum gauge which does not depend on visual observation, but which may be associated with remote indicating, recording or control devices.

Sixth, to provide a high vacuum gauge which is equally sensitive to all gases, or gas mixtures.

Seventh, to provide an improved high vacuum gauge which provides a suitable indication by either amplitude or frequency modulating an oscillator connected in a measuring circuit.

Eighth, to provide an improved high vacuum gauge which can readily transmit its pressure indications by radio signals from the location of the gauge, which location may be inaccessible for various reasons, to accessible location where the information is desired.

Ninth, to provide a high vacuum gauge in which the heated elements need not attain temperatures sufficiently high to provoke disassociation of even the most unstable molecules whose vapor pressures are to be measured or which may be present in the gauge for any reason.

Tenth, to provide a high vacuum gauge in which the heated elements need not operate at temperatures so high as to endanger their life through accidental admission of air or other chemically active vapors into contact with said hot elements.

Eleventh, to provide a vacuum gauge in which it is possible to record pressures and changes in pressure occurring in much shorter intervals of time than heretofor.

Twelfth, to provide a high vacuum gauge whose "zero point" reading (the reading to be expected when the pressure is negligibly small relative to the gauge sensitivity) can be readily checked at any time (by removing the source of heat responsible for the temperature difference which sets up the aforementioned pressure differential).

With the foregoing and other objects in view as may appear hereinafter, reference is directed to the accompanying drawings, in which:

Figure 1 is a longitudinal sectional view of one form of my high vacuum gauge.

Figure 2 is a transverse sectional view thereof taken through 2—2 of Figure 1.

Figure 3 is another transverse sectional view thereof taken through 3—3 of Figure 1.

Figure 4 is another transverse sectional view thereof taken through 4—4 of Figure 1.

Figure 5 is a longitudinal sectional view similar to Figure 1 showing a modified form of my high vacuum gauge.

Figure 6 is a transverse sectional view thereof taken through 6—6 of Figure 5.

Figure 7 is a wiring diagram illustrating one form of shunt utilized in conjunction with the sensitive element of my gauge as employed in the modification shown in Figures 5 and 6.

Figure 8 is a similar wiring diagram illustrating another shunting means useful in the arrangement shown in Figures 5 and 6

Figure 9:
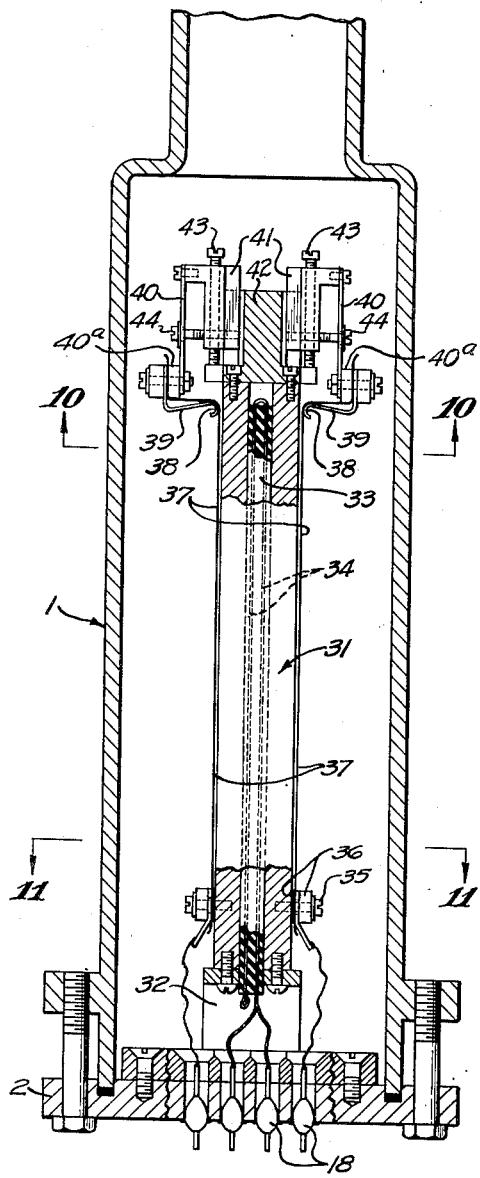
Figure 9 is a longitudinal sectional view of a further modified form of my high vacuum gauge.
Figure 10:
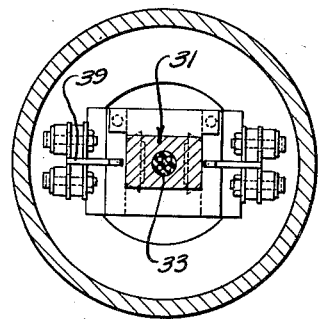
Figure 10 is a transverse sectional view through 10—10 of Figure 9.
Figure 11:
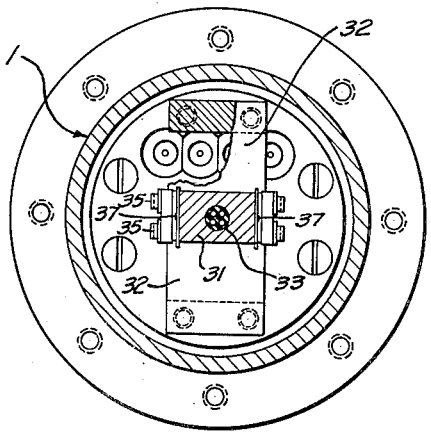
Figure 11 is another transverse sectional view through 11—11 of Figure 9.
Figure 12:
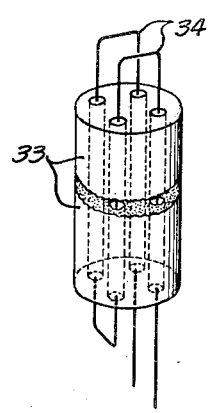
Figure 12 is an enlarged fragmentary and substantially diagrammatical view of the heater element employed in the modification of my high vacuum gauge shown in Figures 9-11 inclusive.

My gauge is intended to measure pressures in the order of $10^{-6}$ mm. Hg ($10^{-9}$ atmospheres) to $10^{-2}$ mm. Hg ($10^{-5}$ atmospheres) such as are present in high vacuum equipment, for example: X-ray tubes, cathode ray tubes, mass spectrometer, magnetic isotope separation apparatus, vacuum vaporizing equipment, vacuum distillation equipment, cyclotrons, synchrotrons, etc., and in the rarefied upper strata of the earth's atmosphere.

The gauge utilizes the Knudsen pressure principle described in a paper by Knudsen (Annelen der Physik 32, page 809 1910) in which it is shown that if a light metal vane is placed in a vacuum so that it is confronted on one side with a hot surface and on the other side with a cooler surface a net pressure proportional to the gas pressure present will be exerted on the vane. This is due to the fact that the average velocity of the molecules bombarding the side of the vane confronting the hot surface is higher than the average velocity of the molecules bombarding the other side thereof confronting the cooler surface.

For the Knudsen principle to be present, the gap between the vane and the two surfaces of different temperature must be small compared to the mean-free-path of gas molecules. At the pressure in question this is easily realized for at $10^{-6}$ mm. Hg and 25° C. the mean-free-path of air molecules is about 100 meters while at $10^{-2}$ mm. Hg the mean-free-path is about one centimeter.

Gauges operating on the Knudsen principle are well known; in these gauges a small vane is rotated against the restoring torque of a suspension fiber. Rotation is measured by reflecting a light beam from a mirror suitably attached to the vane. Such gauges are relatively bulky, very sensitive to vibration, must be carefully leveled, and in addition must be directly read. As indicated in the foregoing objects, my gauge while retaining the advantages of the Knudsen Gauge, eliminates its defects.

Reference is first directed to the construction shown in Figures 1-4 inclusive.

In this construction an envelope 1 is employed which is sealed by an end plate 2. Extending from the end plate 2 into the envelope 1 are posts 3 which support a mounting block 4 of channel cross section.

Secured within the mounting block 4 and extending longitudinally is a ribbon support or bar 5 which includes an end piece at its extremity remote from the end plate 2 and a bridge 7 near its end adjacent the end of plate 2. A ribbon 8 is secured to the end piece 6 and extends over the bridge 7 for attachment to a tension spring 9 in the form of a leaf spring secured to a slide 10. The slide 10 and the lower portion of the support 5 are provided with coacting dove-tail ways so that the slide may be adjusted longitudinally to vary the tension on the ribbon 8. A set screw 11 is provided to effect such adjustment.

Supported within the channel formed by the mounting block 4 and insulated from the ribbon 8 is a plate electrode 12 which includes a surface disposed contiguous to and parallel with the ribbon 8. The plate electrode is mounted on suitable insulation spacers 13 and held by screws 14.

Overlying the ribbon 8 on the opposite side thereof from the plate electrode 12 is a heater plate 15 which is supported by brackets 16 extending from the flanges of the mounting block 4.

Adjacent one end of the ribbon 8, preferably adjacent the end piece 6, is a damper magnet 17. The pole pieces of the magnet confront opposite edges of the ribbon 8. The axial extent of the magnet with respect to the ribbon is such that the magnet will dampen vibrations below a predetermined frequency; for example, but not by way of limitation, harmonics up to the fourth harmonic of the ribbon.

The ribbon 8 constitutes the sensitive element of my gauge. It is preferably formed of beryllium, beryllium copper alloy, Duralumin, gold alloy or other material having comparable properties. Its thickness is approximately 0.0007 to 0.0001 inch. The ribbon is preferably maintained under a tension in the order of 100 dynes per centimeter of ribbon width or less. The ribbon 8 and plate electrode 12 constitute plates of a condenser which are connected by leads, not shown, to a pair of terminals 18 provided in and insulated from the end plate 2. Other terminals 19 are connected by leads, not shown, to the extremities of the heater plate 15 and to a source of electrical energy capable of maintaining the heater plate at a temperature range between 25° C. and 50° C.

Operation of my high vacuum gauge shown in Figures 1–4 is as follows:

The envelope containing the vacuum gauge may be connected through a tube 1a to a vacuum system, which is to be measured or if the gauge itself is to be placed within the vacuum system the envelope may be omitted. To illustrate the latter case, the vacuum gauge may be mounted in the bell jar of a vacuum evaporator.

It is essential, however, that the envelope containing the gauge have an electrically conductive inner surface to avoid the formation of static charges which might interfere with proper functioning of the gauge.

The ribbon 8 and plate electrode 12 are connected to an electronic circuit as will be described in more detail hereinafter.

It is not necessary to know the operating temperature of the heater plate nor even to provide means for maintaining this temperature at a constant value. In fact, a desirable non-linear scale of response to pressure is obtained by supplying a constant power input to the heater instead of maintaining it at a constant temperature. That is, if a constant power input is maintained, the heater runs cooler as the pressure increases and this results in a more compressed scale of response at the higher pressures so that a wider range is afforded with nearly the same per cent accuracy. In order further to increase the range of response, it is desirable to operate the heater at a lower power input for higher pressures, and in this way two or more scales of sensitivity are easily established. None of the foregoing remarks are to be considered as precluding the possibility of operating the heater at constant temperature, thermostating the heater, and measuring its temperature if desired in special applications.

Under the conditions of high vacuum the natural damping of the ribbon due to the gas viscosity is low. It is therefore desirable in some cases to dampen the motion of the ribbon magnetically. This is accomplished by the eddy currents induced due to motion of the ribbon in the field of the permanent magnet 17.

Reference is now directed to Figures 5-8 inclusive.

The construction here illustrated differs principally from the first described structure in that in place of the heater 15 and electrode plate 12, a combined heater and condenser plate 21 is employed.

The plate 21 is mounted on insulators 22 extending from the ribbon support 5. The ribbon 8 overlies the plate 21 and is spaced therefrom by small separators 23 located at the extremities of the plate 21.

An insulator block 24 is substituted for the end piece 6 on the ribbon support 5 and serves to anchor the ribbon 8. The other extremity of the ribbon is connected to the tension spring 9 as in the first described structure. Appropriate insulation prevents the ribbon 8 from being in electrical connection with the block 10 or the frame of the gauge. In the arrangement shown in Figures 5 and 6 the extremities of the ribbon 8 are connected by a shunt lead 25 shown in Figure 7. Alternatively radio frequency chokes 27 may be provided at each end of the plate 21. The chokes are grounded as shown. A damping magnet 17 is provided similar to the one already described in Figure 1.

With this arrangement eddy currents generated by movement of the ribbon are shunted to ground. The eddy current frequencies are dependent upon the natural mechanical frequency of the ribbon and may be in the order of 50 cycles per second.

Such low frequency may be readily short circuited to ground through the chokes while they keep the ribbon isolated as regards high frequency from the frame of the gauge or from the envelope so as to permit the ribbon 8 to be the insulated element whose change in capacity to the cooperating other electrode, that is the plate 21, produces the changes in the high frequency electrical circuit indicative of the vacuum pressures. This arrangement has the advantage that the fixed capacity of the ribbon may be kept very low because of its small dimensions.

Reference is now directed to Figures 9-12 inclusive.

The vacuum gauge here illustrated is also shown as contained within an envelope 1. Centered within the envelope is a heater post 31 supported from the end plate 2 by suitable brackets 32. The heater post is provided with a central bore in which an electrical heating element is mounted. One form of heating element may consist of an insulating rod 33 preferably of ceramic material. The insulating rod may in fact be constituted of a series of ceramic beads. In either case four longitudinal passages are provided through which is threaded a heating element 34 of electrical resistance wire. The mid portion of the heating element is doubled upon itself and the two legs threaded upwardly through the insulating rod 33, then each leg is doubled upon itself and threaded downwardly through one of the remaining passages as shown best in Figure 12. One purpose of this configuration is to keep the effect of the magnetic field of the heating current in exerting forces on the ribbons 37 at a minimum.

Secured on opposite sides of the heater post 31 are anchor screws 35 which clamp between washers 36 and a pair of ribbons 37. The washers are formed of insulating material and the ribbons are so secured as to be insulated from the heater post 31. The pair of ribbons extend upwardly parallel to the surface of the heater post; then fold outwardly around guide fingers 38 formed at the extremities of tension springs 39. The ribbons and tension springs are insulated from the leaf spring 40 by insulating blocks 40ª. The tension springs are supported at the ends of leaf springs 40 which extend in substantial parallelism with the axis of the heater post 31. The leaf springs 40 are mounted on suitable slides 41 which are in turn slidably mounted on a common mounting block 42 secured to the extremity of the post 31. Set screws 43 are employed to move the slide 41 longitudinally and set screws 44 are employed to move the beams laterally with respect to the slides. With this arrangement the ribbons 37 may be placed under the proper tension and at the proper spacing from the surface of the heater post.

Figure 13:
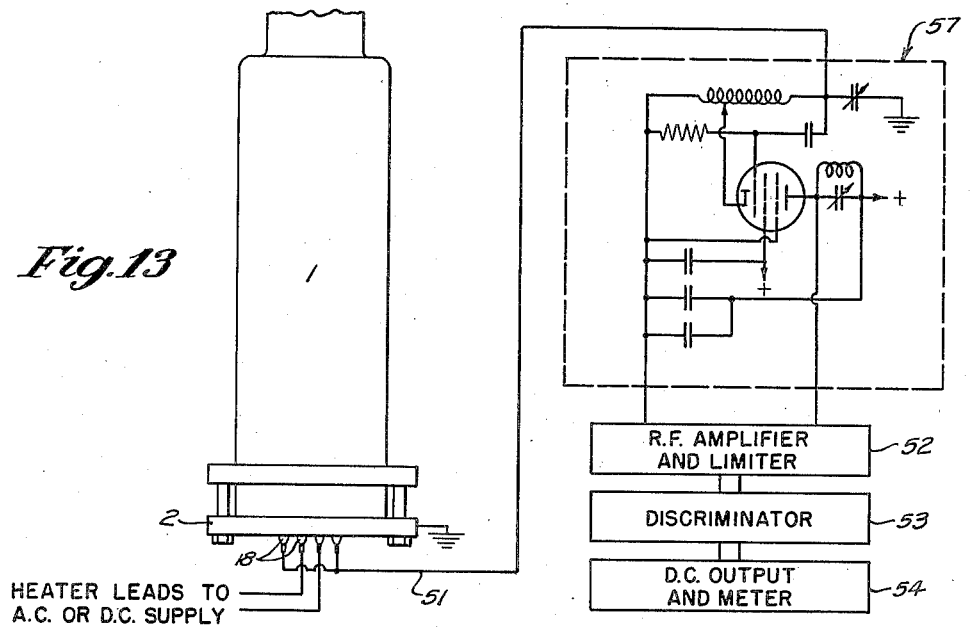
Figure 13 is a partial wiring diagram, partial block diagram of a frequency modulated electronic circuit for use with any of my high vacuum gauges illustrated in the preceding figures.

Reference is now directed to Figure 13.

The ribbon 8 of Figure 1, the combined heater and plate electrode 21 of Figure 5 and the heater post 31 (which also serves as electrode plate) of Figure 9 are grounded to the end plate 2 indicated in Figure 13. The plate 12 of the first described structure, the ribbon 8 of the second structure or the pair of ribbons 37 of the last described structure join to a lead 51 which communicates with a measuring oscillator 57. The measuring oscillator may be of the Hartley type arranged for coupling to a radio frequency amplifier and limiter 52 which is in turn connected to a discriminator 53; for example, the well known Foster Seeley discriminator. The discriminator is connected to a direct current output circuit and meter 54. Changes in capacity to ground of the insulated element in the gauge because of deflection of the ribbon in response to differential forces of thermal molecular bombardment on its two sides produce shifts in the frequency of the oscillator 57. These shifts in frequency are translated into varying intensities of D. C. output proportional to the frequency shifts by means well known in the art of frequency modulation. The D. C. output can therefore be used as an index of the pressure to be measured. The output corresponding to "zero" pressure can be readily established by turning off the heating supply and allowing thermal equilibrium to be established throughout the gauge.

Figure 14:
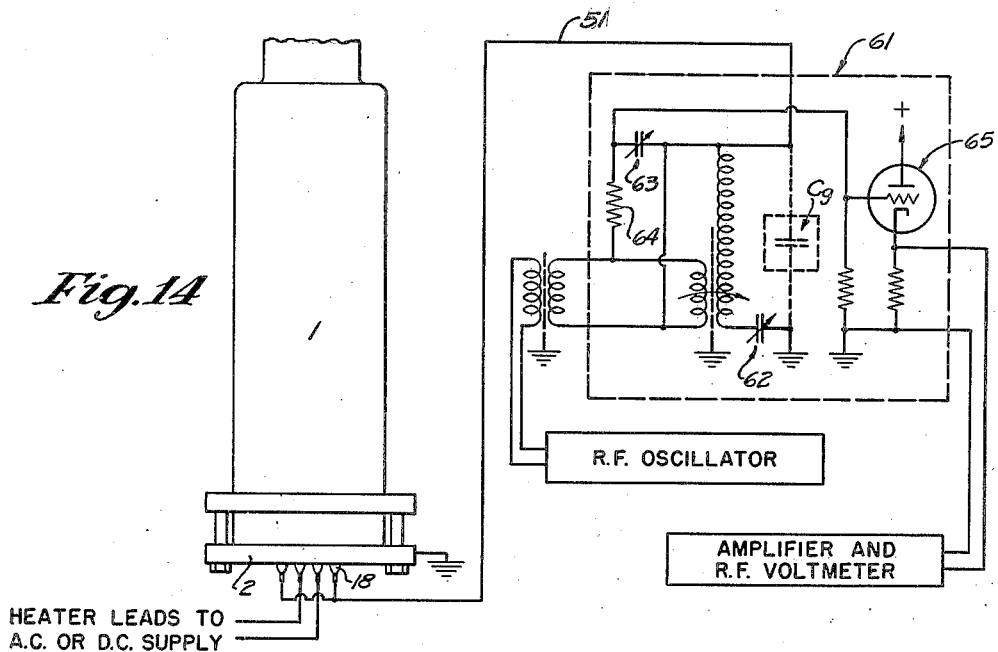
Figure 14 is another partial wiring diagram, partial block diagram of an amplitude modulating electronic circuit for use in conjunction with any of my vacuum gauges illustrated in the preceding figures.

Reference is now directed to Figure 14. In this case the lead 51 is connected to an amplitude modulation circuit indicated generally by 61. The elements of this circuit are contained within a heavy copper shield. In this circuit the effect of the gauge capacity is represented by dotted lines.

The R. F. oscillator represented as a block and so labelled is preferably crystal controlled and has an extremely sharply defined fixed stable frequency and amplitude. The resonant frequency of the tank circuit consisting of the gauge capacity $C_g$, the variable condenser 62 and the self and mutual inductances coupled to these varies with variation of $C_g$ in response to pressure changes in the gauge as already described. Differences between the constant supply frequency from the oscillator and the variable resonant frequency of the tank circuit result in differences in amplitude and phase of current and voltage response in the tank circuit.

A network such as the resistor 64 and the condenser 63 is used to furnish an R. F. voltage of appropriate amplitude and phase to cancel the R. F. voltage across the gauge capacity $C_g$ in the tank circuit. The vector difference between the two above mentioned voltages is furnished to the grid of the cathode follower tube 65. The circuit elements are adjusted to give zero signal at the grid of 65 for the "zero" point capacity of the gauge; i. e., the capacity which obtains when no heat is supplied to the gauge heater and thermal equilibrium has been established. With heat supplied to the gauge heater changes in gauge capacity $C_g$ because of deflections of the gauge ribbon upset the above mentioned balance and result in an R. F. voltage at the grid of tube 65 which is approximately proportional to the change in $C_g$ and hence to the pressure in the gauge. This R. F. voltage is amplified in power by the cathode follower tube 65 and further amplified and made to indicate its value in the block designated "amplifier and R. F. voltmeter" by means well known in the art.

It should be observed that the ribbon, a movable element in each embodiment, is equally exposed on both or opposite sides to the free molecules remaining in the evacuated region so that any displacement is due solely to the higher energy of the molecules on the heated side of the ribbon; in other words, the displacement is due to the differential in intensity of molecular bombardment on opposite sides of the ribbon.

The range of the gauge is dependent on the spacing between the movable element and the adjacent electrode or plate. As this space is decreased the range of the gauge is increased. A spacing in the order of .001 inch is adequate for satisfactory operation.

Having thus described certain embodiments and applications of my invention, I do not desire to be limited, but intend to claim all novelty inherent in the appended claims.

I claim:

1. A gas pressure measuring device for low pressures such as those in the range from 0.001 micron to 100 microns involving: a pair of electrical elements forming the electrodes of a variable capacity adapted to be mounted in an evacuated region where the gas pressure is sufficiently low to exhibit the Knudsen effect; at least one of said elements being movable in response to molecular bombardment by the thermal motion of the gas molecules; and means for establishing zones of different temperature confronting opposite sides of said movable element while permitting free access for the molecules of the low pressure gas to either zone indifferently so as to cause a corresponding differential in intensity of molecular bombardment on said opposite sides of the movable element, thereby to effect displacement of said movable element, and electrical means for measuring the resulting change in electrical capacity between the movable and fixed elements relative to the value of said capacity when no temperature differential exists as a means of indicating the gas pressure.

2. A gas pressure measuring device for low pressures such as the range from 0.001 micron to 100 microns involving: a pair of electrical elements forming the electrodes of a variable capacity adapted to be mounted in an evacuated region where the gas pressure is sufficiently low to exhibit the Knudsen effect; at least one of said elements being movable in response to molecular bombardment by the thermal motion of the gas molecules; and means for establishing zones of different temperature confronting opposite sides of said movable element while permitting free access for the molecules of the low pressure gas to either zone indifferently so as to cause a corresponding differential in intensity of molecular bombardment on said opposite sides and thereby to effect displacement of said movable element against an elastic restoring force; means establishing a magnetic field surrounding said movable element for damping movement thereof; and electrical means for measuring the resulting change in electrical capacity between the movable and fixed elements relative to the value of said capacity when no temperature differential exists as a means of indicating the gas pressure.

3. A low gas pressure measuring device for installation in a region sufficiently evacuated to exhibit the Knudsen effect, and arranged for connection to a capacity measuring circuit, said device involving: an envelope adapted for communication with the gas whose low pressure is to be measured, said envelope having internal, grounded conducting surfaces; an elongated metallic body disposed in said envelope, a heater element disposed within said body; at least one movable metallic ribbon disposed under tension in close proximity to said body, the side of said ribbon confronting said body being exposed to bombardment by the molecules of the gas which have just recoiled from collision with said heated body and whose velocities therefore correspond to the temperature of said body as maintained by said heater, the opposite side of said ribbon being exposed to bombardment by gas molecules at the ambient temperature within said envelope lower than that of the heated body, free access being permitted for the molecules of the low pressure gas to either side of the ribbon indifferently whereby said ribbon moves in response to molecular velocity differential existent on opposite sides of said ribbon; said body and ribbon forming the elements of a condenser, the capacity of which varies with displacement of said ribbon so that said variations in capacity from the capacity which obtains when no temperature difference exists can be taken as a measure of the pressure of the gas.

4. A sensitive unit for measuring low gas pressures, and adapted for connection to an external electronic measuring circuit, involving: an elongated metal body; at least one metal ribbon disposed along and contiguous to but electrically insulated from said body and so arranged as to permit equally free access for the molecules of the low pressure gas to the spaces on either side of the ribbon indifferently; means for heating said body so that the side of said metal ribbon confronting said body is exposed to bombardment by molecules recoiling from the heated body at a greater temperature than the molecules which bombard the opposite side of the ribbon, whereby, under conditions of vacuum pressure in excess of one millionth of one millimeter of mercury, a molecular bombardment differential is produced tending to displace said ribbon to an extent proportional to the gas pressure present; said ribbon and body forming the elements of a condenser for connection to an electronic capacity measuring circuit, the variations in capacity from the capacity which obtains when no temperature differential exists being taken as a measure of the gas pressure.

5. A vacuum sensitive unit for connection to a capacity measuring circuit, involving: a pair of capacitance coupled elements adapted to be mounted in an evacuated region sufficiently rare to exhibit the Knudsen effect; at least one of said elements being movable in response to molecular bombardment; opposite sides of said element being equally exposed to the free molecules present in said region; and means for establishing a temperature differential between the zones confronting opposite sides of said movable element to cause a corresponding differential in intensity of molecular bombardment, thereby to effect displacement of said movable element, thus varying the capacitance between said elements in proportion to the vacuum pressure in said region whereby the vacuum pressure may be measured.

6. A vacuum sensitive unit for connection to a capacity measuring circuit, involving: a pair of capacitance coupled elements adapted to be mounted in an evacuated region sufficiently rare to exhibit the Knudsen effect and equally exposed on opposite sides to the free molecules present in said region; at least one of said elements being movable in response to molecular bombardment; and means for establishing a temperature differential between the zones confronting opposite sides of said movable element to cause a corresponding differential in intensity of molecular bombardment, thereby to effect displacement of said movable element; and means for damping movement of said movable element, thus varying the capacitance between said elements in proportion to the vacuum pressure in said region whereby the vacuum pressure may be measured.

7. A vacuum sensitive unit for installation in a region sufficiently evacuated to exhibit the Knudsen effect, and arranged for connection to a capacity measuring circuit, said vacuum sensitive unit involving: a capacitance including a fixed element and a movable metallic ribbon disposed under tension and in proximity to said fixed element both sides of said ribbon being equally exposed to free molecules present in said region; and means for creating zones of different temperature confronting opposite sides of said metal ribbon to cause a corresponding differential in intensity of molecular bombardment against opposite sides of said ribbon thereby to effect displacement thereof, thus varying the capacitance between said fixed element and said movable metallic ribbon in proportion to the vacuum pressure in said region whereby the vacuum pressure may be measured.

8. A vacuum sensitive unit for installation in a region sufficiently evacuated to exhibit the Knudsen effect, and arranged for connection to a capacity measuring circuit, said vacuum sensitive unit involving: a condenser having a movable element both sides of which are equally exposed to free molecules present in said region said element being responsive to molecular velocity differential existing in the regions confronting opposite sides of said element to vary the capacity of said condenser; and means for establishing such molecular velocity differential, whereby movement of said movable element and resulting change in capacity of said condenser is in proportion to the vacuum pressure in said region whereby the vacuum pressure may be measured.

9. A vacuum sensitive unit for installation in a region sufficiently evacuated to exhibit the Knudsen effect, and arranged for connection to a capacity measuring circuit, said vacuum sensitive unit involving: an envelope adapted for communication with a zone the vacuum pressure of which is to be measured, said envelope having internal grounded conducting surfaces; an elongated metallic body disposed in said envelope; a heater element disposed within said body; at least one movable ribbon disposed under tension in close proximity to said body, the side of said ribbon confronting said body being exposed to a molecular bombardment corresponding to the temperature of said body as maintained by said heater, the opposite side of said ribbon being exposed to the ambient temperature within said envelope; whereby said ribbon moves in response to molecular velocity differential as existent on opposite side of said ribbon; said body and ribbon forming the elements of a condenser, the capacity of which varies with displacement of said ribbon, thereby to measure the vacuum pressure in said region.

10. A sensitive unit for measuring high vacuum pressures, and adapted for connection to an electronic measuring circuit, involving: an elongated metal body; at least one metal ribbon disposed along and contiguous to said body both sides of said ribbon being equally exposed to free molecules present in said region; means for heating said body whereby the side of said metal ribbon confronting said body is exposed to a greater temperature than the opposite side thereof, whereby, under conditions of vacuum in excess of one millionth of one millimeter of mercury, a molecular bombardment differential is produced tending to displace said ribbon in proportion to said vacuum pressure; said ribbon and body forming the elements of a condenser for connection to an electronic measuring circuit, thereby to measure said vacuum pressure.

11. A sensitive unit for measuring high vacuum pressures, and adapted for connection to an electronic measuring circuit, involving: a condenser for connection to an electronic measuring circuit including a rigid body and a ribbon under tension and in contiguous relation to said body; both sides of said ribbon being equally exposed to free molecules present in said region; and means for establishing regions of different temperature confronting opposite sides of said ribbon, whereby upon subjecting said regions to pressures less than one millionth of one millimeter of mercury, said ribbon is subjected to a differential molecular bombardment tending to displace said ribbon in proportion to said vacuum pressure thereby to effect corresponding change in the capacity of said condenser and to measure said vacuum pressure.

12. A gas pressure measuring device for high to moderate vacuum for installation in a region sufficiently evacuated to exhibit the Knudsen effect, said device being arranged for connection to an electrical capacity measuring circuit, and said pressure measuring device involving: a capacitance including a fixed element, a movable metallic ribbon element, means disposing said ribbon element under tension and in proximity to said fixed element but electrically insulated therefrom, all sides of said ribbon element being exposed equally to the molecules of low pressure gas present in said region; and means for creating zones of different gas temperature confronting opposite sides of metal ribbon so as to cause a corresponding differential in intensity of molecular bombardment against opposite sides of said ribbon element; and to cause corresponding variation in the capacity of said capacitance in proportion to the pressure of the gas.

13. A low gas pressure measuring device for installation in a region sufficiently evacuated to exhibit the Knudsen effect, said device involving: a condenser having a movable element, all sides of said movable element being equally exposed to the molecules of gas present in said evacuated region; means for establishing molecular velocity differential in regions confronting opposite sides of said movable element to cause displacement thereof in proportion to the pressure of the gas in said evacuated region; and means for measuring changes in the electrical capacity of the condenser caused by displacement of its movable element thereby to measure said vacuum pressure.

14. A vacuum sensitive unit for installation in a region sufficiently evacuated to exhibit the Knudsen effect, and arranged for connection to a capacity measuring circuit, said vacuum sensitive unit involving: a condenser having a fixed element and a movable element both sides of said movable element equally exposed to free molecules present in said region, said movable element being responsive to molecular velocity differential existing in the regions confronting opposite sides of said element; and means for heating said fixed element to establish such molecular velocity differentials, whereby said movable element affects the capacity of said condenser in proportion to the vacuum pressure in said region thereby to measure said vacuum pressure.

JESSE WILLIAM MONROE DU MOND.

References Cited in the file of this patent

UNITED STATES PATENTS

| Number | Name | Date |
|---|---|---|
| 2,234,328 | Wolff | Mar. 11, 1941 |
| 2,447,816 | Rieber | Aug. 24, 1948 |

OTHER REFERENCES

Williams (Publication) "A Knudsen Absolute Manometer" Journal of Sc. Instr. July 1946, pages 144–146.